United States Patent [19]

Marinos et al.

[11] 3,912,582

[45] Oct. 14, 1975

[54] HYDRAULIC BALANCING OF A CONTROL COMPONENT WITHIN A NUCLEAR REACTOR

[75] Inventors: Danny Marinos, Kennewick; Hans C. F. Ripfel, West Richland, both of Wash.

[73] Assignee: The United States of America as represented by the United States Energy Research and Development Administration, Washington, D.C.

[22] Filed: Aug. 16, 1974

[21] Appl. No.: 498,147

[52] U.S. Cl. .............................. 176/36 R; 176/86 R
[51] Int. Cl.² ........................................... G21C 7/10
[58] Field of Search ...................... 76/35, 36 R, 86 R

[56] References Cited
UNITED STATES PATENTS 3,533,912   10/1970   Dempsey ........................... 176/36 R
3,773,617   11/1973   Marmonier et al. ............... 176/86 R Primary Examiner—Harvey E. Behrend
Attorney, Agent, or Firm—Dean E. Carlson; Arthur A. Churm; Hugh W. Glenn

[57] ABSTRACT

A reactor control component includes an inner conduit, for instance containing neutron absorber elements, adapted for longitudinal movement within an outer guide duct. A transverse partition partially encloses one end of the conduit and meets a transverse wall within the guide duct when the conduit is fully inserted into the reactor core. A tube piece extends from the transverse partition and is coaxially aligned to be received within a tubular receptacle which extends from the transverse wall. The tube piece and receptacle cooperate in engagement to restrict the flow and pressure of coolant beneath the transverse partition and thereby minimize upward forces tending to expel the inner conduit.

6 Claims, 5 Drawing Figures

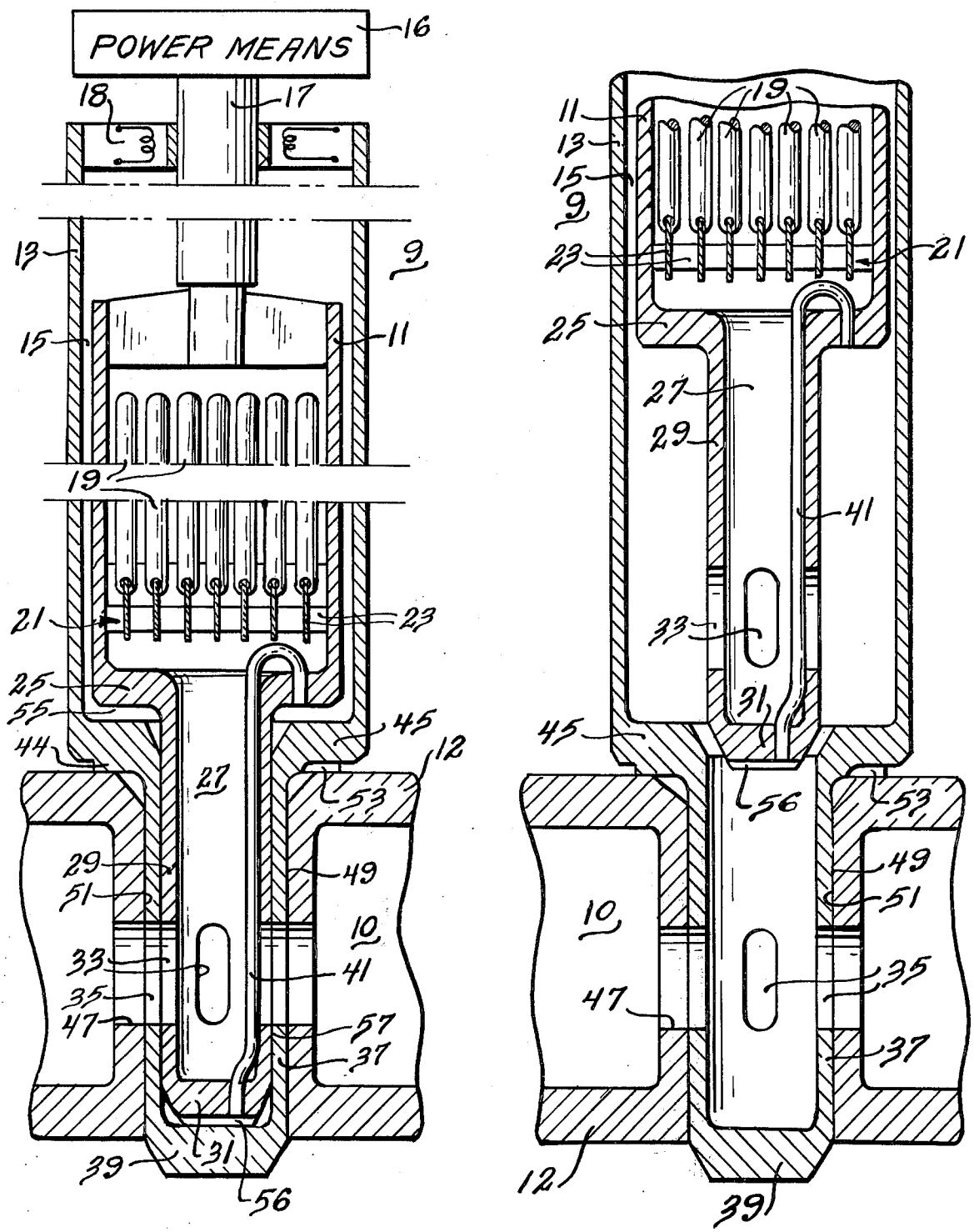

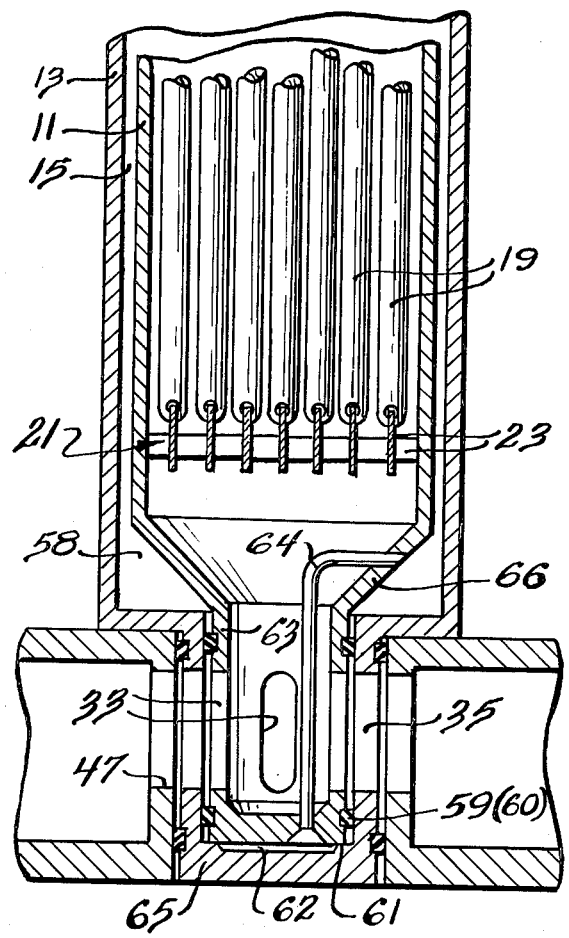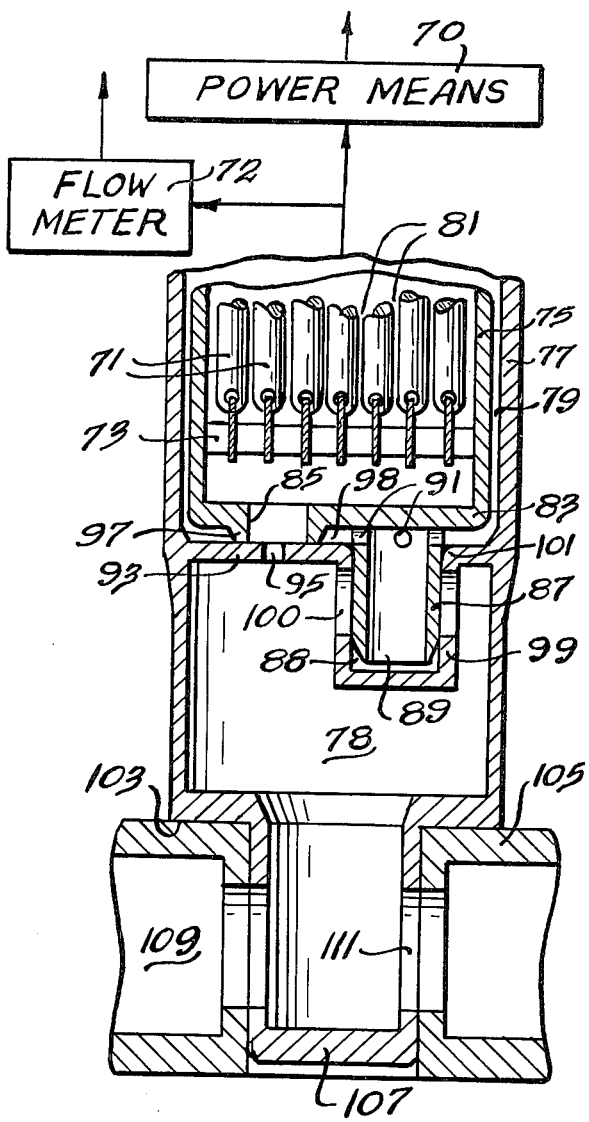

HYDRAULIC BALANCING OF A CONTROL COMPONENT WITHIN A NUCLEAR REACTOR

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to means for hydraulically balancing components within a reactor core. It is particularly applicable to control rods or components employed in liquid-metal-cooled-fast-breeder reactors in which coolant flow and pressure differences may impose large upward forces on individual components.

Generally, mechanical hold-down is provided by the drive mechanism such as an extension rod and a ratchet mechanism included in the drive unit used to withdraw or insert into the reactor core a control rod, as well as hold it at a desired location or position, including the fully inserted position. In refueling or maintenance operations, the mechanical hold-down devices are often disconnected to gain access to the core. In these instances, along with possible failure of the hold-down devices, gravity may be the only force holding the control rod within the reactor.

Upwardly directed forces, such as buoyancy, coolant flow and pressure, act against gravity to urge the control component outwardly from the core. In some situation, these forces may be intensified. For instance, the coolant flow may be restricted, with resulting increased hydraulic pressure. Although unlikely to occur, a complete blockage or coolant flow can be postulated in the neutron-absorber section of the control component. Should the stagnant coolant become sufficiently heated to result in sudden boiling, the resulting vapor pressure would add to the other upward forces tending to expel the component from the reactor.

SUMMARY OF THE INVENTION

Therefore, in view of the limitations and disadvantages of the prior art, it is an object of the present invention to provide a design in which hydraulic balancing is employed to offset the forces tending to expel reactor components.

It is also an object to provide such a design adapted for use with reactor control components which are longitudinally positionable within the reactor.

It is a further object to provide a control component design with means for indicating its position.

In accordance with the present invention, a reactor control component is presented which includes an inner conduit coaxially supported within but spaced from an outer guide duct to form passageways for coolant flow through the inner conduit and through an outer passageway between the conduit and guide duct. The guide duct is provided with a transverse wall towards one end with an open receptacle extending longitudinally from the wall. A transverse partition partially closing the corresponding end of the inner conduit has a matching tube piece coaxially aligned to be received within the receptacle. Both the receptacle and the tube piece include openings for passing coolant flow. Support means permit positioning of the inner conduit in inserted positions with the tube piece received within the receptacle and in withdrawn positions with the tube piece and receptacle apart. The reactor is normally operated with the tube piece completely withdrawn from the receptacle, but when the support means is to be disconnected for maintenance or to obtain access to other reactor components, the tube piece is fully inserted. In the fully inserted position, the tube piece and receptacle cooperate to restrict the flow and pressure of coolant beneath the transverse partition and within the outer passageway to minimize net coolant forces that tend to expel the inner conduit from the reactor core.

BRIEF DESCRIPTION OF THE DRAWINGS

The present invention is illustrated in the accompanying drawings wherein:

FIG. 1 is a vertical section of a reactor-control component with some portions shown diagrammatically.

FIG. 1a is a fragmentary view of the control component of FIG. 1 with inner parts raised to a withdrawn position.

FIG. 1b is a fragmentary view of a modification to the control component of FIG. 1.

FIG. 2 is a vertical section of an alternate embodiment to the control component of FIG. 1.

DETAILED DESCRIPTION OF THE INVENTION

Figure 2A:
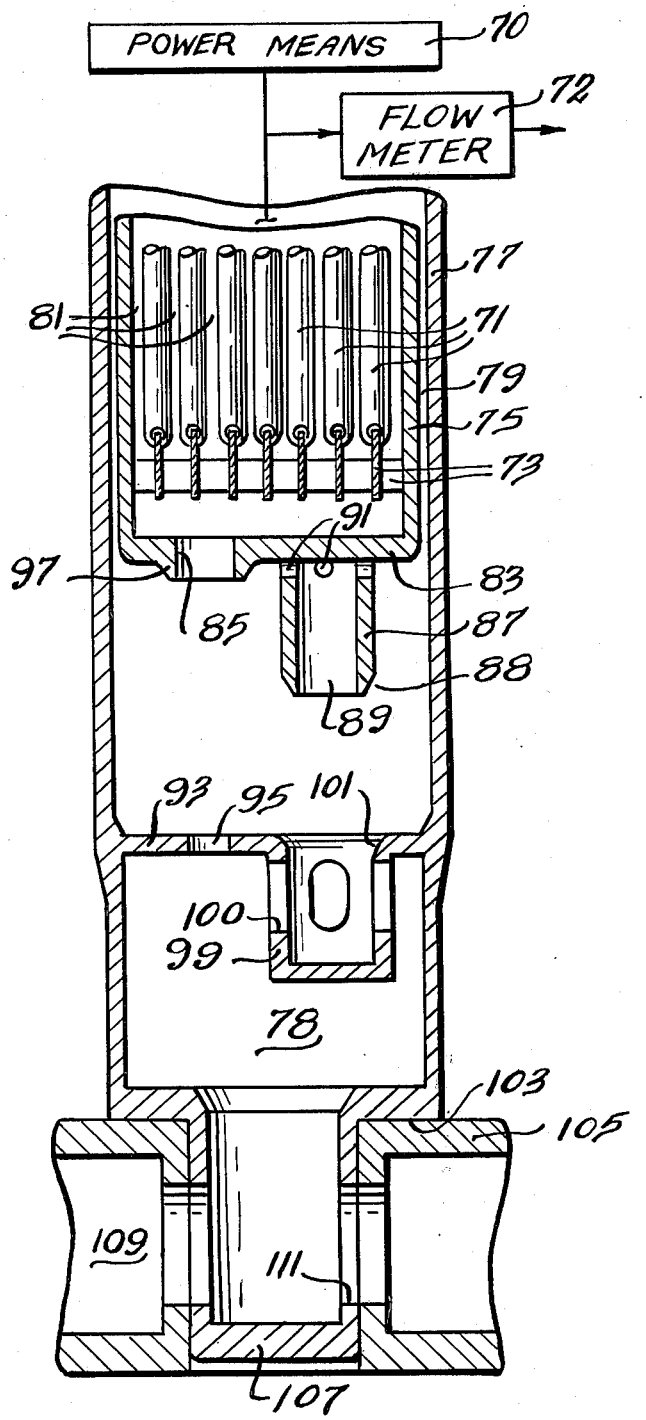
FIG. 2a is the control component of the FIG. 2 embodiment with inner parts raised to a withdrawn position.

Referring to FIGS. 1 and 1a, a reactor control rod assembly is shown supported within a nuclear reactor on a grid plate or header 12 including a plenum 10 for providing high-pressure coolant. The assembly includes an inner conduit 11 coaxially supported within an outer guide duct 13 to form an annular passageway 15. Coolant flows upwardly from high-pressure plenum 10 through the inner conduit 11 and annular passageway 15 into a low-pressure region 9 outside outer guide duct 13.

Conduit 11 is longitudinally positionable at various locations between a fully inserted position shown in FIG. 1 and any number of inserted and withdrawn positions. A typical withdrawn position is illustrated in FIG. 1a. The conduit is raised, lowered, and maintained in the various positions by power means 16 which can be a rack and pinion or other suitable device attached to an extension 17 of the inner conduit 11.

Conduit 11 contains a plurality of neutron absorber pins 19, each of which contains an isotope of an element such as boron or europium that has a high neutron capture cross section. For example, pins 19 may comprise a large number of boron carbide pellets contained within a stainless steel sheath or cladding.

A support grid 21 is affixed laterally across conduit 11 for supporting the neutron absorber pins 19 within the inner conduit. The grid 21 is shown constructed as a lattice of crossed bars 23 with the interstices between bars 23 left open to pass coolant flow. Other grid types such as a perforated metal plate might also be similarly employed. Additional grids or spacer wires (not shown) are spaced lengthwise along the pins for maintaining radial restraint and spacing.

The lower end of conduit 11 is partially covered with a restriction or transverse partition 25 having an opening 27 for admitting coolant flow. A tube piece 29 circumscribes opening 27 and extends downwardly from the end closure in coaxial alignment with a tubular receptacle 37 at the lower end of guide duct 13. The tube piece 29 is positionable within receptacle 37 as shown in FIG. 1 or withdrawn from the receptacle as illustrated in FIG. 1a.

Receptacle 37 extends downwardly from a transverse wall 45 at the lower end of guide duct 13 and includes a tapered opening through the transverse wall for admitting tube piece 29. The transverse wall 45 rests on the upper surface of header 12 for support of the control component assembly and the tubular receptacle 37 is received within an opening 51 through header 12.

The lower, distal ends of both receptacle 37 and the tube piece 29 are covered by end closures 39 and 31, respectively. Above these closures are peripheral openings 33 and 35 through the side walls of the tube piece 29 and the receptacle 37. These side-wall openings 33 and 35 are mutually aligned with similar openings 47 through the walls of opening 51 in header 12. Coolant flow is thereby admitted from the high-pressure plenum 10 through openings 47, 35 and 33 into tube piece 29 and upwards through opening 27 into the inner conduit 11 to cool absorber pins 19.

Some coolant will leak through the interfacial gaps between the walls of opening 51, receptacle 37 and tube piece 29. Gap 49 between the walls of opening 51 and receptacle 37 is preferably as close as possible to permit removal of the receptacle and component assembly but yet minimize the leakage of coolant from high-pressure plenum 10. Gap 57 between receptacle 37 and tube piece 29 is of sufficient width to permit free movement of the tube piece within the receptacle, and to restrict leakage flow of coolant into annular passageway 15. Upwardly flowing coolant is discharged from gap 57 directly into a volume 55 defined between transverse partition 25 and transverse wall 45 when the tube piece 29 is inserted into receptacle 37. Volume 55 directly communicates with annular passageway 15 to permit passage of the coolant flow. Coolant leaking downwardly through gap 57 enters a small space formed by a slot 56 that extends across end closure 31 of tube piece 29. A vent tube 41 communicates with slot 56 and extends upwardly through tube piece 29 to communicate with volume 55 below transverse partition 25.

The lower surface of transverse wall 45 can include an offset 44, as shown, which rests on the upper surface of header 12 to provide support for the control component. A radial slot 53 is provided to communicate with gap 49 and the low-pressure region outside the control component. The upper portion of gap 49 is of increased width with a bevel or taper at the entrance to opening 51 to form a beveled-wall chamber between the transverse partition and header that is vented through radial slot 53.

At the upper end of inner conduit 11 adjacent shaft extension 17, a flowmeter 18 is positioned to monitor the coolant flow prior to its discharge into the low-pressure region 9. When liquid metal coolant is employed, flowmeter 18 will ordinarily be a commercially available, magnetic flowmeter. Such flowmeters measure the flow of an electrically conductive fluid by generating voltage from the fluid flow through a magnetic field.

In the operation of the nuclear reactor control component shown in FIG. 1, the power means 16 is employed to raise, lower and hold the inner conduit assembly in the desired position. Ordinarily a reactor will be operated with the tube piece 29 completely withdrawn from the receptacle 37 as shown in FIG. 1a. In ordinary operating conditions, forces resulting from upward coolant flow are balanced by the weight of the control component and the forces imposed by power means 16. However, when the power means 16 is removed from the inner conduit extension 17, the inner conduit is then supported by tube piece 29 on its end closure 31 within receptacle 37. Alternatively, the tube piece can be supported on a circular shoulder or ridge (not shown) on the lower surface of transverse partition 25. In either case, coolant leaking through gap 57 from the high-pressure plenum will enter volume 55 below transverse partition 25 and slot 56 within end closure 31. This leakage coolant will exert upward forces on end closure 31 and the lower surfaces of transverse partition 25. In balance of these forces are gravity and the downward pressure within the inner conduit and tube piece.

The pressure drop through annular passageway 15 is very small in respect to the pressure drop imparted to the coolant flowing through gap 57. Consequently, the pressure in volume 55 and in slot 56, due to vent tube 41, is nearly the same as in the low-pressure region 9. In contrast, the larger flow of coolant passing through the bundle of absorber elements 19 provides a substantial pressure drop. Therefore, a net downward force is exerted on transverse wall 25 and on end closure 31 due to the higher pressure within the lower portion of the inner conduit than in volume 55 and slot 56 below the partition and clousre.

Before disconnecting positioning means 16 from extension 17 of the inner conduit, it is important to ensure that the tube piece 29 is fully inserted into receptacle 37. Otherwise the above-described balancing features cannot be expected to counteract the upward forces produced by the coolant. The total flow of fluid that passes through flowmeter 18 includes the flow through the inner conduit and the flow through annular passageway 15. When tube piece 29 is withdrawn from receptacle 37, as shown in FIG. 1a, a substantial flow of fluid passes through both annular passageway 15 and inner conduit 11. As tube piece 29 is inserted into receptacle 37, peripheral openings 33 are partially or totally occluded against the upper wall surfaces of the receptacle, causing an abrupt curtailment of the coolant flow passing through flowmeter 18. On further descent of the tube piece, openings 33 become aligned with openings 47 and 35 to partially restore the flow rate. The original flow rate of coolant that was passing through the operating control component is not completely regained due to the pressure drop and resulting flow reduction through gap 57 into annular passageway 15. By monitoring the above-described changes in coolant flow, the position of the inner conduit can be determined and the positioning means 16 disconnected only after the tube piece is fully inserted into receptacle 37.

A modification to the FIG. 1 embodiment is illustrated in FIG. 1b. Circumferential grooves 59 are machined in the outer periphery of tube piece 63 and sealing rings 60 positioned within each groove to seal leakage coolant flow from entering volumes 58 and 62. Consequently, the upward forces of coolant pressure are even further diminished than in the FIG. 1 configuration. Sufficient coolant is provided to the absorber pins through the inner conduit with only a very small flow through an annular passageway 15.

FIG. 1b also shows a circular ridge 61 on the upper surface of end closure 65 of the receptacle for supporting the tube piece when the positioning means is disconnected. Volume 62 is thereby maintained to provide an unimpeded entrance to a vent tube 64. An oblique transverse partition 66 is illustrated as a modification to the internal conduit to eliminate the 180° bend in the vent tube of FIG. 1.

Referring now to FIGS. 2 and 2a where there is shown an alternate embodiment of the present invention. This embodiment provides a substantial difference in coolant flow rate between the inserted position illustrated in FIG. 2 and the withdrawn position of the inner conduit as illustrated in FIG. 2a.

Absorber pins 71 are supported on a grid structure 73 in a similar manner to that described in FIG. 1. An inner conduit 75 containing the absorber pins 71 is disposed within an outer guide duct 77 and can be raised and lowered in respect to the outer guide duct with a rack and pinion or other power means 70 illustrated diagrammatically. Inner conduit 75 is coaxially spaced from the outer guide duct 77 to form an annular passageway 79 for coolant flow. A larger flow of coolant is passed upwardly through the inner conduit in the interstitial spaces 81 between the absorber pins 71. The rate of coolant flow is measured with flowmeter 72 as the coolant is discharged from the control component into the low-pressure region of the reactor.

The lower end of conduit 75 is partially covered with a transverse partition 83 having an opening 85 for coolant flow. A tube piece 87 is abutted and attached to the lower surface of partition 83 at a location laterally spaced from opening 85. The lower end of tube piece 87 includes an inwardly tapered portion 88 and an axial opening 89, while the upper axial passageway is closed by transverse partition 83. Peripheral apertures 91 are near the top of tube piece 87 adjacent transverse partition 83 to allow the coolant to pass into annular passageway 79.

A transverse wall 93 is affixed so as to divide the length of outer guide duct 77 into a lower vestibule 78 and an upper portion containing inner conduit 75. When the conduit 75 is in the inserted position shown in FIG. 2, partition 83 is disposed adjacent to but spaced from wall 93 by a raised ring 97 circumscribing opening 85, thus forming space 98 therebetween. The wall 93 includes an aperture 95 which is coaxially aligned with opening 85 and is of smaller diameter than this opening. A tubular receptacle 99 depends from within an opening through transverse wall 93 and is coaxially aligned to receive tube piece 87 in the inserted position. The mouth 101 of receptacle 99 is tapered inwardly as shown to accurately align tube piece 87 as it is inserted from the withdrawn position. Peripheral openings 100 in receptacle 99 are occluded by tube piece 87 disposed in the inserted position except for a narrow gap between the tapered end portion 88 and the lower boundary of the openings.

The lower end of guide duct 77 is of restricted diameter to form a shoulder 103 which rests on a header 105 to provide support for the control-component assembly. Header 105 contains passageways or a plenum 109 for supplying high-pressure coolant to the control component. A closed extension 107 projects through an opening in header 105 and includes peripheral openings 111 aligned with corresponding openings communicating with the high-pressure coolant in plenum 109.

In the normal operation of the control component, the inner conduit will be disposed in various withdrawn positions illustrated in FIG. 2a. However, when it becomes necessary to disconnect the inner conduit from the power means, the inner conduit is lowered into the inserted position to take advantage of the hydraulic balancing features of the present invention.

Referring to FIG. 2, the coolant flow from the high-pressure plenum 109 passes through openings 111 into vestibule 78. With the tube piece 87 and conduit 75 in the inserted position, the coolant passes through aperture 95 and opening 85 into the inner conduit 75. Coolant flow through openings 100 into receptacle 99 is restricted by the coaction of tube piece 87 and the walls of the receptacle forming a close gap both upwards and downwards from the uppper and lower boundary of opening 100. The leakage which passes said gap downwardly from the lower boundary of opening 100 through opening 89 is discharged from peripheral apertures 91 into space 98 and annular passageway 79. The leakage that passes the gap between receptacle 99 and tube 87 upwardly from the upper boundary of opening 100 goes to space 98 and from there to annular passageway 79. This combined leakage flow undergoes a major portion of the total pressure drop through the component as it passes through the gap between receptacle 99 and the tube 87. The remainder of the flow, particularly through annular passageway 79, exerts a much smaller pressure drop on the coolant flow to establish a relatively low pressure in space 98 below the transverse partition 83. The pressure drop through the bundle of absorber pins is substantially greater than the pressure drop through passageway 79, also considering that the flow rates differ greatly in that the pin bundle sees a higher flow rate than the annular passageway. Consequently, the pressure and resulting downward force exerted on the top surface of transverse partition 83 is greater than the pressure and upward force exerted on the bottom surface of that partition. The net downward force from this pressure difference added to the weight of the component is made sufficient to overcome all of the lifting forces of the coolant and secure the inner conduit within the guide duct when the positioning means is disconnected.

Referring now in particular to FIG. 2a, where the inner conduit 75 is shown in a withdrawn position, it is seen that a much larger coolant flow can pass through and around the inner conduit. With tube piece 87 withdrawn from receptacle 99, coolant enters the amply sized openings 100 and flows upward through guide duct 77, as indicated, into the inner conduit 75 through opening 85. Coolant also flows upward through annular passageway 79 at an increased rate over that of the inserted position due to the removal of the flow restrictions provided by the cooperating tube and receptacle pieces.

In the withdrawn position, raised ring 97 no longer separates the coolant flowing above and below the transverse partition 83. Therefore, the net downward force described above in respect to the inserted position is no longer provided. Of course, in the operation of a reactor control rod, the power means 70 will be engaged for support and hold-down of the inner conduit when it is withdrawn above the transverse wall.

It is desirable to provide indication of the inner conduit position prior to disconnecting the power means 70. This can be accomplished through use of flowmeter 72 to indicate whether a low coolant flow corresponding to the inserted position or a high coolant flow corresponding to the withdrawn position has been attained.

It will be seen that the present invention provides a reactor-control component in which buoyancy and upward pressure forces are more than offset by gravity and downward pressure forces. A relatively low-pressure region is provided to act against the higher pressure of the system in the above-described scheme of hydraulic balancing. The design permits mechanical hold-down devices to be disconnected when the reactor is shut down for refueling or repairs with minimal risk of control rod ejection.

The embodiments of the invention in which an exclusive property or privilege is claimed are defined as follows:

1. In a reactor-control component having an inner conduit containing neutron-absorber elements, said conduit supported coaxially within but spaced from a guide duct to form passageways for coolant flow, said passageways including an inner passageway through said conduit and an outer passageway through the annular space between said conduit and guide duct, the improvement comprising:
   a. a transverse wall interrupting said guide duct at an end portion thereof, said wall having a tubular receptacle extending longitudinally therefrom and an opening for admitting coolant flow;
   b. a transverse partition partially closing one end of said inner conduit, said partition having a tube piece longitudinally extending therefrom towards and in coaxial alignment with said receptacle and having an opening for admitting coolant flow; and
   c. movable support means for longitudinally positioning said inner conduit in respect to said guide duct in inserted positions in which said tube piece is closely received within said receptacle and in withdrawn positions in which said tube piece is separated from said receptacle, said tube piece and receptacle cooperating in said inserted position to restrict the flow of coolant into said outer passageway and thereby minimize forces that tend to expel said component from said inserted position.

2. The component of claim 1 wherein said tube piece and receptacle each have peripheral-wall openings that align in said inserted position for admitting coolant into said inner passageway and a clearance is provided between said transverse wall and said transverse partition that admits coolant leakage flow from between said tube piece and receptacle into said outer passageway, said tube piece having a closure over the distal end thereof and means for venting leakage coolant from beneath said tube piece to said outer passageway.

3. The component of claim 1 wherein a flowmeter is included for measuring the combined coolant flow through both said inner and outer passageways, said tube piece and receptacle cooperate in said inserted position to alter the rate of coolant flow whereby the position of said inner conduit is revealed.

4. The component of claim 3 wherein said tube piece and receptacle each have peripheral wall openings for passing coolant flow into said inner passageway, said openings within said tube piece and said receptacle being in alignment when said conduit is in a fully inserted position but being out of alignment and at least partially occluded when said conduit is in a partially inserted position, whereby substantial changes in flow rate are registered by said flowmeter on insertion and withdrawal of said inner conduit.

5. The component of claim 1 wherein said receptacle includes one closed end distally disposed from said transverse wall and one open end through said wall for receiving said tube piece in a closely positioned, mating relationship and including peripheral-wall openings for admitting coolant flow, said tube piece having an opening at its distal end for passing coolant leakage flow from between said tube piece and receptacle and having peripheral-wall apertures near its proximal end for discharging said leakage flow of coolant into said outer passageway when said conduit is in said inserted position.

6. The component of claim 5 wherein said transverse partition and transverse wall each include an orifice for admitting coolant into said inner passageway, said orifices being coaxially aligned at a location laterally disposed from said tube piece and receptacle, said transverse-partition orifice being circumscribed with a raised ring for sealing against said transverse wall to provide a space communicating with said outer passageway and containing coolant of reduced pressure between said wall and partition when said inner conduit is disposed in said inserted position, whereby coolant-flow forces on said transverse partition being greater from within said inner conduit than from opposing coolant-flow forces on said partition from within said space.

* * * * *